United States Patent
Kamei et al.

(10) Patent No.: US 6,730,439 B2
(45) Date of Patent: May 4, 2004

(54) HEAT-RESISTANT SEPARATOR

(75) Inventors: Toshikazu Kamei, Isehara (JP); Masaki Yamazaki, Isehara (JP)

(73) Assignee: Tonen Tapyrus Co., Ltd., Tokayo (JP)

( * ) Notice: Subject to any disclaimer, the term of this patent is extended or adjusted under 35 U.S.C. 154(b) by 324 days.

(21) Appl. No.: 09/917,804

(22) Filed: Jul. 31, 2001

(65) Prior Publication Data

US 2002/0045091 A1 Apr. 18, 2002

(51) Int. Cl.$^7$ ................................................. H01M 2/16

(52) U.S. Cl. ........................ 429/247; 429/249; 429/253; 429/254; 429/34; 429/38; 204/296; 361/512

(58) Field of Search ................................. 429/247, 249, 429/253, 254, 34, 38; 204/296; 361/512

(56) References Cited

U.S. PATENT DOCUMENTS 5,609,947 A  *  3/1997  Kamei et al. ................ 428/212

\* cited by examiner

*Primary Examiner*—Bruce F. Bell
(74) *Attorney, Agent, or Firm*—Armstrong, Kratz, Quintos, Hanson & Brooks, LLP

(57) ABSTRACT

A heat-resistant separator composed of a non-woven fabric of high-melting resin, 1 to 20 $\mu$m in average fiber diameter, 5 to 300 g/m$^2$ in basis weight, 1 to 200 cc/cm$^2$/sec in air permeability, and 0.01 to 1.0 mm in thickness, or a laminated heat-resistant separator composed of a laminate having a melt-blown, non-woven fabric layer of high-melting resin, 1 to 20 $\mu$m in average fiber diameter, 5 to 300 g/m$^2$ in basis weight, 1 to 200 cc/cm$^2$/sec in air permeability, and 0.01 to 1.0 mm in thickness is more resistant to heat, and hence safer, and is suitable for batteries and electrical double-layer capacitors serviceable at high temperature.

17 Claims, No Drawings

HEAT-RESISTANT SEPARATOR

TECHNICAL FIELD

This invention relates to a separator, low in electrical resistance and excellent in resistance to heat and breaking, for batteries or capacitors, comprising a melt-blown non-woven fabric of high-melting resin or laminate having a melt-blown non-woven fabric.

BACKGROUND OF THE INVENTION

Melt-blown non-woven fabrics of polyolefin, in particular polypropylene, have been going into various areas with their favorable characteristics, e.g., various separation membranes and separators, e.g., those for batteries, electrolysis condensers, capacitors and polymer batteries. In particular, these separators are widely used for the lithium batteries (primary and secondary), because they are insoluble in organic solvents and stable to electrolytes and electrode active materials.

Short-circuit of a battery, either inside or outside, is generally accompanied by discharge of large current, and the resultant Joule heat or heat of chemical reaction may cause shrinkage or melting of the separator between the anode and cathode to directly cause short-circuit of these electrodes, possibly aggravating the internal short-circuit, with the result that large quantities of heat and/or gases may be released outside. In order to solve these problems, the separator is preferably provided with a shut-down function, i.e., the function of blocking ions and hence current, or a function of preventing the separator itself from being shrunk or molten.

The conventional separator of non-woven fabric of polyolefin, e.g., polyethylene or polypropylene, tends to suffer short-circuit resulting from melting of the separator, when exposed to high temperature for extended periods, in particular when used in an automobile engine or subjected to soldering, because of low-melting point of polyolefin, around 125 to 140° C. for polyethylene and 160 to 180° C. for polypropylene. The separator for the advanced lithium ion battery or electrical double-layer capacitor is required to have various characteristics, such as high capacity, improved electrical characteristics and productivity, and safety. One of the safety-related functions is the shut-down function, which blocks current, when the electrode is short-circuited to increase temperature inside of the battery, by melting the separator to close its pores before lithium is ignited, in order to prevent hazards, e.g., fire. Another function is melt-down of the separator itself, when temperature further rises after the shut-down, to control combustion or explosion of the battery. These functions are to control temperature run-away when battery is overcharged or tested for heating preservation.

At present, a secondary battery serviceable at high temperature, high in heat resistance and dispensing the shut-down function or replacing it with another safety mechanism is in demand, because of its improved safety-related characteristics, e.g., electrolytic solution of higher resistance to heat, external protective circuit against short-circuit and polymer electrolyte of improved safety. This, in turn, needs a separator of higher resistance to heat and free of short-circuit.

Recently, a battery provided with the conventional separator of polyethylene or polypropylene may be required to work at a temperature higher than its melting point in the vicinity of an automobile engine or for an electrical double-layer capacitor. Moreover, a battery which is assembled using soldering has been developed. Therefore, a separator of higher resistance to heat and lower electrical resistance has been in demand. Another problem to be solved is that a separator of thin polyolefin-based films may be broken or torn, when it is wound or laminated together with the electrode to form a battery.

It is an object of the present invention to provide a heat-resistant separator low in electrical resistance, sufficiently responding to reduced thickness of the films for the battery, excellent in resistance to heat and breaking, not melting even when left at high temperature, and free of short-circuit of the electrode, to solve the problems involved in the conventional techniques. It is another object of the present invention to provide a highly safe, laminated separator having a function of blocking permeability at low temperature.

DISCLOSURE OF THE INVENTION

The inventors of the present invention have found, after having extensively studied to solve the above problems, that use of a non-woven fabric of high-melting resin having specific properties can give a separator of low electrical resistance and excellent in resistance to heat, and that use of the laminate of the non-woven fabric can give a separator resistant to melt down and having a shut-down function, or a separator resistant to heat and breaking even when thickness of the film is reduced, reaching the present invention.

The first invention is a heat-resistant separator composed of a non-woven fabric of high-melting resin, 1 to 20 μm in average fiber diameter, 5 to 300 g/m² in basis weight, 1 to 200 cc/cm/sec in air permeability, and 0.01 to 1.0 mm in thickness.

The second invention is the heat-resistant separator of the first invention having a real part impedance of 20 Ω·cm² or less at a frequency of 10 KHz and normal temperature.

The third invention is the heat-resistant separator of the first or second invention having a maximum real part impedance at a frequency of 10 KHz and 100 to 180° C. is 100 times or less of the real part impedance at normal temperature and 200 Ω·cm² or less in the absolute value.

The fourth invention is the heat-resistant separator of one of the first to third inventions, wherein the high-melting resin is selected from the group consisting of polyester, polyphenylene sulfide, polymethyl pentene and polyamide.

The fifth invention is the heat-resistant separator of the fourth invention, wherein the polyester is polybutylene terephathalate.

The sixth invention is the heat-resistant separator of one of the first to fifth inventions, wherein the non-woven fabric is melt-blown.

The seventh invention is a laminated heat-resistant separator composed of a laminate having a melt-blown, non-woven fabric layer of high-melting resin, 1 to arm 20 μm in average fiber diameter, 5 to 300 g/m² in basis weight, 1 to 200 cc/cm²/sec in air permeability, and 0.01 to 1.0 mm in thickness.

The eighth invention is the laminated heat-resistant separator of the seventh invention, composed of a melt-blown, non-woven fabric layer of high-melting resin and non-woven fabric layer having a shut-down function.

The ninth invention is the laminated heat-resistant separator of the eighth invention, wherein the non-woven fabric layer having a shut-down function is of polyolefin.

The 10$^{th}$ invention is a laminated heat-resistant separator of polyphenylene sulfide, comprising two or more laminated layers of melt-blown, non-woven fabric of polyphenylene sulfide, which has a fiber diameter of 2.0 to 8.0 µm, basis weight of 20 to 60 g/m², air permeability of 10 to 200 cc/cm²/sec, thickness of 100 to 300 µm, and strength of 10N/50 mm or more in the MD direction.

The 11$^{th}$ invention is the laminated heat-resistant separator of polyphenylene sulfide of the 10$^{th}$ invention, wherein the melt-blown, non-woven fabric of polyphenylene sulfide for the laminated layers has an average fiber diameter of 2.0 to 8.0 µm, basis weight of 40 to 80 g/m², air permeability of 5 to 20 cc/cm²/sec, thickness of 100 to 180 µm, and strength of 40N/50 mm or more in the MD direction.

The 12$^{th}$ invention is the heat-resistant separator of one of the first to 11$^{th}$ inventions which is used for a battery or capacitor.

PREFERRED EMBODIMENTS OF THE INVENTION

The present invention provides a heat-resistant separator for batteries or capacitors composed of a non-woven fabric of high-melting resin or a laminate having a layer of the non-woven fabric of high-melting resin. It is described in more detail below.

1. High-Melting resin

The high-melting resin for the present invention has a melting point of 200° C. or higher. Such resins include polyester, polymethyl pentene, polyphenylene sulfide, and polyamide.

The polyesters useful for the present invention include polyethylene terephthalate, polybutylene terephthalate (hereinafter sometimes referred to as PBT), polybutylene isoterephthalate, polybutylene adipate, poly (1,6-hexamethylene terephthalate), poly (ethylene-2,6-naphthalate) and poly (1,4-cyclohexylene methylene terephthalate). They may be homopolymers, copolymers or mixtures thereof. Of these, a mixture of polybutylene terephthalate and polybutylene isoterephthalate is more preferable, because it can improve melt-blow spinnability and strength of the non-woven fabric.

The polybutylene terephthalate is not limited, so long as it is a polybutylene terephthalate-based polymer having butylene terephthalate as the main repeating unit. The polybutylene terephthalate may be a homopolymer or copolymer having polybutylene terephthalate as the main component, e.g., polybutylene isoterephthalate or polybutylene adipate. It may be a mixture of polybutylene terephthalate as the main component and other polyester-based polymer(s) as the minor component(s). These other polyester-based polymers which can be mixed with polybutylene terephthalate include polyethylene terephthalate, polybutylene isoterephthalate, polybutylene adipate, poly (1,6-hexamethylene terephthalate), poly (ethylene-2,6-naphthalate) and poly (1,4-cyclohexylene methylene terephthalate). Of these, a mixture of polybutylene terephthalate and polybutylene isoterephthalate is more preferable, because it can improve melt-blow spinnability and strength of the non-woven fabric. The polybutylene terephthalate having a number-average molecular weight of 5,000 to 20,000 is suitably used.

The examples of the above-described polymethyl pentene include polyolefin produced by polymerization of 4-methyl pentene-1, which is obtained by dimerization of propylene. One example is the one supplied by Mitsui Chemicals (trade name: TPX), having a melting point of 230 to 240° C.

The examples of the above-described polyphenylene sulfide include a polymer excellent in resistance to heat and chemicals, and mainly (90% by mol or more) composed of the $C_5H_4S$ unit. Particularly preferable is a polyphenylene sulfide (hereinafter sometimes referred to as PPS) having a melt viscosity ($V_6$) of 200 to 500 poise.

The examples of the above-described polyamide (hereinafter sometimes referred to as PA) include nylon 6, nylon 66, nylon 6-66 copolymer, nylon 12, nylon 6-12 copolymer and nylon 46. PA for the melt-blown non-woven fabric preferably has as low a molecular weight as possible, viewed from spinnability and obtaining fine fibers. It preferably has a molecular weight of 10,000 25,000.

The above-described high-melting resin having a melting point of 200° C. or higher may be incorporated, as required, with one or more common additives, e.g., pigment, colorant, compatibilizer, inorganic filler, surfactant, antioxidant and ultraviolet ray absorber. It may be further incorporated with a resin, e.g., polyolefin-based resin or thermoplastic elastomer which can impart a shut-down function to the non-woven fabric within limits not harmful to the function(s) of the present invention.

2. Properties of the Non-Woven Fabric

The non-woven fabric of high-melting resin which constitutes the present invention can be used for lithium ion-based battery separators and electrical double-layer capacitors. For example, it can be used for a separator impregnated with an electrolytic solution of propylene carbonate, ethylene carbonate, γ-butyrolactone, a mixture thereof, composite solvent of the electrolytic solution and a low-viscosity solvent, or organic solvent (e.g., fluorinated carbonate) as the electrolytic solution. Such a separator needs the non-woven fabric having the following properties.

(1) Average Fiber Diameter

The non-woven fabric for the present invention has an average fiber diameter of 1 to 20 µm, preferably 1 to 8 µm, more preferably 2 to 4 µm. The battery or electrical double-layer capacitor may have an excessive internal resistance, when the average diameter is less than 1 µm. When it is more than 20 µm, on the other hand, possibility of internal short-circuit increases even in the laminate-based one, which tends to suffer tension to a lesser extent. In a battery or cylindrical capacitor, on which the non-woven fabric is strongly wound, internal short-circuit is liable to occur resulting from irregularities of the active material or the like, when the average diameter exceed 8 µm.

(2) Basis Weight

The non-woven fabric for the present invention has a basis weight of 5 to 300 g/m², preferably 5 to 120 g/m², more preferably 10 to 60 g/m². Basis weight of less than 5 g/m² may cause problems, e.g., insufficient separator strength, reduced reliability of the assembly and tendency to short-circuit, and hence is undesirable. On the other hand, internal resistance of the battery may increase excessively, when basis weight is more than 300 g/m².

(3) Air Permeability

The non-woven fabric for the present invention has an air permeability of 1 to 200 cc/cm²/sec, preferably 3 to 60 cc/cm²/sec. Internal resistance of the battery may increase excessively, when air permeability is less than 1 cc/cm²/sec. On the other hand, possibility of internal short-circuit increases when it is more than 200 cc/cm²/sec.

(4) Thickness

The non-woven fabric for the present invention has a thickness of 0.01 to 1.0 mm. The non-woven fabric having a thickness in the above range can be calendered to a desired thickness. It may be filmed excessively when it is thinner than 0.01 mm, and fluffed excessively when it is thicker than 1.0 mm.

(5) Real Part Impedance

The non-woven fabric for the present invention, when measured by immersing in an electrolytic solution, preferably has a real part impedance of 20 Ω·cm² or less at a frequency of 10 KHz and normal temperature, more preferably 10 Ω·cm² or less. Real part impedance of more than 20 Ω·cm² may increase internal electrical resistance excessively and hence is undesirable. Reducing internal electrical resistance increases apparent capacity of the battery, controls heat generation, and extend its service life.

It is preferable that the maximum real part impedance at a frequency of 10 KHz and 100 to 180° C. is 100 times or less of the real part impedance at normal temperature and 200 Ω·cm² or less in the absolute value. When the maximum real part impedance at a frequency of 10 KHz and 100 to 180° C. is more than 100 times of the real part impedance at normal temperature and more than 200 Ω·cm² in the absolute value, the separator may tend to shut down and have an excessive internal electrical resistance, making the battery difficult to use at high temperature.

Real part impedance at a high frequency, e.g., 10 kHz, corresponds to solution resistance via the separator and separator-induced internal resistance.

(6) Tensile Strength in the MD Direction

The non-woven fabric of polymethyl pentene for the present invention preferably has a tensile strength of 10N/50 mm or more. Tensile strength of less than 10N/50 mm in the MD direction may cause cutting or breaking of the non-woven fabric, when it is assembled into the battery.

3. Production of the non-woven fabric

The method of producing the non-woven fabric of high-melting resin for the present invention is not limited, so long as the produced non-woven fabric satisfies the above properties. It may be produced by a known method, e.g., wet, thermal bonding, dry, span bonding or melt blowing process, of which the melt blowing process is especially suitable, because it can give the non-woven fabric of very fine fibers.

A known melt blowing process may be used for production of the non-woven fabric. For example, the molten resin of high melting point is discharged from two or more nozzles disposed in series, and air is ejected at high temperature and speed onto the resin from gas-ejecting nozzles adjacent to the orifice dies, to make it into fine fibers. These fibers are collected on a conveyor, and formed into a non-woven fabric. When polyphenylene sulfide resin is used, the melt blowing conditions must be carefully set, because it has a relatively high melting point and is decomposed at near its melting point. The non-woven melt-blown under the following conditions is particularly preferable for the present invention.

It is preferable that the nozzle has a diameter of 0.2 to 0.8 mm and that 5 to 15 nozzles/cm are disposed in the die of the melt blowing unit. The resin is discharged at an excessively high pressure when the nozzle diameter is below the above range, and it is difficult to produce sufficiently fine fibers when it exceeds the above range. The resin is discharged at an excessively high pressure when number of the nozzles is below the above range, and uniformity of the non-woven fabric may not be secured when it exceeds the above range, because the fibers may be excessively fused with each other.

The preferable melt blowing conditions are resin extrusion temperature: 280 to 420° C., resin discharging rate: 0.2 to 3 g/min/hole, high-speed air temperature: 280 to 400° C. The resin will be discharged at an excessively low pressure when its extrusion temperature is below the above range, and the resin aging will be accelerated when it exceeds the above range. It will be difficult to have the uniform non-woven fabric when resin discharging pressure is excessively low and the fine fibers when it is excessively high. The fine fibers may not be obtained when high-speed air temperature is excessively low, and the continuous fibers may not be obtained when it is excessively high, because the fibers tend to be broken, making it difficult to collect them on the conveyor net.

4. Heat-Resistant Separator Composed of the Non-Woven Fabric of High-Melting Resin The heat-resistant separator of the present invention is composed of the above-described non-woven fabric of high-melting resin, and generally used after being calendered to have a certain thickness. The non-woven fabric may be embossed, or laminated with a polyolefin-based melt-blown non-woven fabric, depending on its purposes. It may be further treated, e.g., by graft polymerization or coated with a surfactant, to improve compatibility of its surface with liquids, also depending on its purposes.

The heat-resistant separator of the present invention can be used as the one for lithium-based batteries (primary and secondary) or the like. In particular, it is suitable for heat-resistant type batteries serviceable at high temperature, e.g., vehicle-carried or reflow-solderable batteries. The other areas it can go into include electric double-layer capacitors subjected to charging/discharging cycles as the power sources for personal computers, portable telephones, electric vehicles (including hybrid vehicles), and other industrial devices.

5. Laminated, Heat-Resistant Separator Having a Non-Woven Fabric Layer of High-Melting Resin The laminated, heat-resistant separator of the present invention is composed of a laminate of non-woven fabric layers, wherein these layers may be of the same non-woven fabric described above, or different from each other in melting point.

(i) Laminated, Heat-Resistant Separator of Laminate Composed of Two or More Layers of Different Resins The laminated separator of the present invention uses the above-described non-woven fabric of high-melting resin for the base layer, which is laminated with one or more resin layers of non-woven fabrics. The resin for the layer to be laminated on the base layer is not limited, so long as it has a melting point different from that of the resin for the base layer. However, it preferably has at least 20° C. lower, more preferably at least 40° C. lower, melting point than the fabric for the base layer. Still more preferably, the non-woven fabric has a shut-down function.

The low-melting resins having a shut-down function include polyolefin. The polyolefins useful for the present invention include the crystalline homopolymers, polymers produced in 2 stages and copolymers of ethylene, propylene, 1-butene, 4-methyl-pentene-1 and 1-hexene, and a mixture thereof. Of these, particularly preferable ones include polyethylene, polypropylene, ethylene/propylene copolymer, high-density polyethylene and copolymer of ethylene and an a-olefin having 4 to 8 carbon atoms in the side chain, and linear, low-density polyethylene and copolymer of ethylene and an a-olefin having 4 to 8 carbon atoms in the side chain. They may be used either individually or in combination. These include the composite ones, e.g., those of sheath/core structure or other types of conjugate fibers. Of these, polypropylene (hereinafter sometimes referred to as PP) and polyethylene (hereinafter sometimes referred to as PE) are still more preferable.

The method of producing the above-described non-woven fabric of resin having a shut-down function is not limited, so long as the non-woven fabric it gives melts at low temperature to exhibit the shut-down function, when its laminate is used for battery or capacitor separators.

The above-described non-woven fabric may be produced by the wet or dry process for short fibers, span bonding which directly produce the non-woven fabric from the resin, or melt blowing. Of these, the non-woven fabric produced by melt blowing process is especially suitable, because it is composed of readily melting, very fine fibers. The melt-blown non-woven fabric of polyolefin is still more preferable.

The above-described melt-blown, non-woven fabric of polyolefin preferably has an average fiber diameter of 0.5 to 20 $\mu$m, more preferably 1 to 5 $\mu$m, and basis weight of 5 to 120 g/m$^2$, more preferably 7 to 100 g/m$^2$.

The laminate of the non-woven fabric layers of different melting point is treated by common calendering or embossing. When calendering is adopted, the non-woven fabrics are preheated and compressed, either separately or after being laminated, by a preheating/compressing roll under heating into the laminate. The preheating roll is preferably set at temperature at least 30° C. lower than melting point of the resin for the non-woven fabric and, at the same time, 200° C. or lower. It is preferably 100° C. or lower when low-melting polyolefin resin is used, to prevent deterioration of the non-woven fabric properties, in particular air permeability. More specifically, it is preferably 70° C. or lower for polyethylene, and 90° C. or lower for polypropylene.

Embossing, when adopted, is effected by the aid of heat or ultrasonic waves. For thermal embossing, the non-woven fabrics are laminated and passed through a gap between the hot embossing roll and elastomer roll, to be compressed under heating into the laminate. The hot embossing roll is preferably set at 150° C. or lower, more preferably 100 to 150° C. for the non-woven fabric of polypropylene, to prevent deterioration of its properties, in particular air permeability. When the hot roll is not directly in contact with the non-woven fabric of polypropylene, it is preferably set at 180° C., to improve its adhesion. The elastomer roll may be replaced by metallic roll. For ultrasonic embossing, the non-woven fabrics are laminated and passed through a gap between the embossing roll and ultrasonic horn, to be compressed while being irradiated with ultrasonic waves into the laminate. Frequency of the ultrasonic waves is preferably 20,000 to 40,000 Hz. Ultrasonic embossing is suitable for laminating non-woven fabrics of greatly different melting point, because it needs no heat source.

It is particularly suitable for laminating the melt-blown non-woven fabric of polyphenylene sulfide or polybutylene terephthalate with that of polyethylene.

Examples of the laminates comprising two or more layers of melt-blown, non-woven fabrics of high-melting resins include the two-layer laminates of PA/PBT, PPS/PBT and PA/PPS. The laminates of a melt-blown, non-woven fabric of high-melting resin and non-woven fabric of resin having a shut-down function include two-layer laminates of PA/PP or PE, PBT/PP or PE and PPS/PP or PE, and three-layer laminates of PP or PE/PBT/PP or PE, PP or PE/PPS/PP or PE. When three or more layers are used, the layer of resin of higher melting point may be put inside or outside.

It is preferable that the laminate is calendered or embossed under controlled conditions to have the properties with respect to average fiber diameter, average basis weight, thickness and air permeability required for the battery or capacitor separators; average fiber diameter: 0.5 to 20 $\mu$m, average basis weight: 5 to 100 g/m$^2$, thickness: 0.01 to 1.0 mm, and air permeability: 1 to 100 cc/cm$^2$/sec. The laminate may not give a separator which satisfies the battery requirements, when one of the above properties goes beyond the above range.

The laminated heat-resistant separator of the present invention can be used for lithium-based batteries (primary or secondary) and electrical double-layer capacitors. In particular, it can be a highly safe battery separator which exhibits a function of blocking permeability at low temperature, when heat is generated by short-circuit, and sustains the separator shape even at high temperature to prevent explosive temperature run-away, e.g., melt-down.

(ii) Laminated, Heat-Resistant Separator of Laminate Composed of Two or More Layers of the Same Resin The separator of the laminate of non-woven fabric of polyphenylene sulfide as one of the high-melting resins can be highly safe, excellent in resistance to heat and breaking, and sustaining the separator shape even at high temperature to prevent explosive temperature run-away. The laminate is preferably composed of two or more melt-blown, non-woven fabrics having the following properties to exhibit the above characteristics.

Average fiber diameter of the melt-blown, non-woven fabric of PPS is 2.0 to 8.0 $\mu$m, preferably 2.0 to 4.0 $\mu$m. The battery may have an excessive internal resistance when the average diameter is less than 2.0 $\mu$m. When it is more than 8.0 $\mu$m, on the other hand, possibility of internal short-circuit increases.

Average basis weight of the melt-blown, non-woven fabric of PPS is 20 to 60 g/m$^2$, preferably 25 to 55 g/m$^2$. Basis weight of less than 5 g/m$^2$ may cause problems, e.g., insufficient separator strength, reduced reliability of the assembly and tendency to short-circuit, and hence is undesirable. On the other hand, internal resistance of the battery may increase excessively when basis weight is more than 60 g/m$^2$.

Average air permeability of the melt-blown, non-woven fabric of PPS is 10 to 200 cc/cm$^2$/sec, preferably 20 to 100 cc/cm$^2$/sec. Internal resistance of the battery may increase excessively, when air permeability is less than 10 cc/cm$^2$/sec. On the other hand, possibility of internal short-circuit increases, when it is more than 200 cc/cm$^2$/sec.

Thickness of the melt-blown, non-woven fabric of PPS is 100 to 300 $\mu$m, preferably 120 to 300 $\mu$m. Its electrolyte-holding capacity will be deteriorated when the thickness is less than 100 $\mu$m, and non-woven fabric strength will be insufficient when it is more than 300 $\mu$m.

Strength of the melt-blown, non-woven fabric of PPS in the MD direction is 10N/50 mm or more, preferably 20N/50 mm or more. Reliability of the assembly is reduced, when strength in the MD direction is less than 10N/50 mm.

The laminate of PPS is composed of two or more layers, preferably two layers, of melt-blown, non-woven fabric of polyphenylene sulfide produced by the above-described melt-blowing process. Lamination of two or more layers brings an effect of efficiently holding an electrolytic solution, when it is used for a separator, making the separator highly resistant to breaking.

The laminate of PPS is treated by common calendering or embossing. When calendering is adopted, the non-woven fabrics of polyphenylene sulfide are preheated and compressed, either separately or after being laminated, by a preheating/compressing roll under heating into the laminate. The preheating roll is preferably set at temperature at 100 to 150° C., more preferably at least 30° C. lower than melting point of polyphenylene sulfide. The preheating effect will be insufficient at lower than 100° C., and permeability of the laminate will be deteriorated at higher than 150° C.

Embossing, when adopted for the laminate of PPS, is effected by the aid of heat or ultrasonic waves. For thermal embossing, the non-woven fabrics are laminated and passed through a gap between the hot embossing roll and elastomer roll, to be compressed under heating into the laminate. The hot embossing roll is preferably set at 130 to 190° C., more preferably 150 to 170° C., to prevent deterioration of the laminate, in particular air permeability. The elastomer roll may be replaced by metallic roll.

For ultrasonic embossing, the non-woven fabrics are laminated and passed through a gap between the embossing roll and ultrasonic horn, to be compressed while being irradiated with ultrasonic waves into the laminate. Frequency of the ultrasonic waves is preferably 20,000 to 40,000 Hz. Ultrasonic embossing is suitable for laminating non-woven fabrics of greatly different melting point, because it needs no heat source.

The laminate of melt-blown, non-woven fabric of polyphenylene sulfide can take any configuration, so long as it is composed of two or more layers of the fabric. However, the laminate must satisfy the properties with respect to average fiber diameter, average basis weight, air permeability, thickness and strength in the MD direction, described below.

Average fiber diameter of the laminate of the melt-blown, non-woven fabric of PPS is 2.0 to 8.0 μm, preferably 2.0 to 4.0 μm. The battery may have an excessive internal resistance, when the average diameter is less than 2.0 μm. When it is more than 8.0 μm, on the other hand, possibility of internal short-circuit increases.

Average basis weight of the laminate of the melt-blown, non-woven fabric of PPS is 40 to 80 g/m$^2$, preferably 50 to 80 g/m$^2$. Basis weight of less than 40 g/m$^2$ may cause problems, e.g., insufficient separator strength, reduced reliability of the assembly and tendency to short-circuit, and hence is undesirable. On the other hand, internal resistance of the battery may increase excessively when basis weight is more than 80 g/m$^2$.

Average air permeability of the laminate of the melt-blown, non-woven fabric of PPS is 5 to 20 cc/cm$^2$/sec, preferably 5 to 10 cc/cm$^2$/sec. Internal resistance of the battery may increase excessively, when air permeability is less than 5 cc/cm$^2$/sec. On the other hand, possibility of internal short-circuit increases, when it is more than 20 cc/cm$^2$/sec.

Thickness of the laminate of the melt-blown, non-woven fabric of PPS is 100 to 180 μm, preferably 130 to 170 μm. Its electrolyte-holding capacity will be deteriorated when the thickness is less than 100 μm, and it will become difficult to assemble a battery when it is more than 180 μm.

Strength of the laminate of the melt-blown, non-woven fabric of PPS in the MD direction is 40N/50 mm or more, preferably 45N/50 mm or more. Reliability of the assembly is reduced, when strength in the MD direction is less than 40N/50 mm.

The laminated heat-resistant separator of PPS is composed of two or more layers of melt-blown, non-woven fabric having the above-described properties can be used for, e.g., lithium-based batteries (primary or secondary) and electrical double-layer capacitors. In particular, it can be a highly safe battery separator sustains the separator shape even at high temperature to prevent explosive temperature run-away, e.g., melt-down.

The non-woven fabric may be treated, e.g., by graft polymerization or with plasma, corona or a surfactant, to improve compatibility of its surface with liquids, depending on the purposes of the separator of the present invention.

PREFERRED EMBODIMENTS

The present invention is described in detail by EXAMPLES, which by no means limit the present invention, where the properties were determined by the following analytical procedures.

(1) Fiber diameter: A total of 5 photographs were taken by an electron microscope for arbitrarily selected 5 points of the test piece, and 20 fibers were selected from each photograph to measure their diameters. The average diameter was determined for a total of 100 fibers.

(2) Basis weight: The sample was cut off in the longitudinal direction to prepare a 100 by 100 mm test piece. It was weighed after it reached equilibrium with moisture, to determine basis weight for the unit area (1 m$^2$).

(3) Thickness: The sample was cut off in the longitudinal direction to prepare a 100 by 100 mm test piece. It was measured by a dial thickness gauge to determine its thickness.

(4) Air permeability: The sample was cut off in the longitudinal direction to prepare a 100 by 100 mm test piece. It was measured by Frazir tester to determine its air permeability in accordance with JIS L 1096.

(5) Tensile strength: Tensile strength was determined in accordance with JIS L 1085 under the conditions of distance between grips: 100 mm and tensile speed: 300 mm/minute.

(6) Real part impedance: Real part impedance was measured by an impedance analyzer (SOLARTRON or HOKUTO DENKO CORPORATION) for a 0.01 to 1.0 mm long non-woven fabric put between two metallic electrodes, 16 mm in diameter, and immersed in an electrolytic solution at room temperature and 100 to 180° C. and frequency of 10 KHz. The electrolytic solution was of 1 mol of LiClO$_4$ dissolved in a 50—50 mixed solvent of propylene carbonate and 1,2-dimethoxy ethane in an argon atmosphere.

(7) Heat-resistant strength: A non-woven fabric was immersed and left in γ-butyrolactone at 100° C. for 2 hours, and measured for tensile strength in accordance with JIS L1085.

(8) Short-circuit: A voltage of 400 V was applied to two aluminum electrodes holding a 200 by 200 mm separator in-between. It was judged to be short-circuited when current flowed, and not short-circuited when no current flowed.

(9) Strength in MD direction: Strength was determined in accordance with JIS L1085 under the conditions of distance between grips: 100 mm and tensile speed: 300 mm/minute.

(10) Electrolytic solution absorption rate: A horizontal rod, on which a 200 by 200 mm test piece was pinned, was set at a given height in a tank holding a mixture of PC (propylene carbonate) and DME (1,2-dimethoxy ethane) (50—50 by weight), and descended in the mixed liquid to immerse the test piece to 5 mm from the lower end. The electrolytic solution absorption rate was defined as height (mm) for which the mixed liquid rose by the capillary phenomenon in 30 minutes.

(11) Electrolytic solution holding rate: A 10 by 10 cm test piece, cut off from the sample, was measured for its weight (W) to the order of mg. It was then immersed and left in a mixture of PC (propylene carbonate) and DME (1,2-dimethoxy ethane) (50—50 by weight) for 1 hour, withdrawn from the mixture, suspended from a horizontal rod for 10 minutes to drop the excess mixture from the surface, and measured for its weight (W1) to the order of mg. The electrolytic solution holding rate was determined by the following formula:

Electrolytic solution holding rate (%)=(W1−W)/W×100

(12) Electrolytic solution holding rate under pressure: A test piece, 47 mm in diameter and cut off from the sample, was measured for its weight (W) to the order of mg. It was then immersed and left in a mixture of PC (propylene carbonate) and DME (1,2-dimethoxy ethane) (50—50 by weight) for 1 hour, withdrawn from the mixture, put between filter papers to which a pressure of 80 kg/cm² was applied for 30 minutes, and measured for its weight (W1) to the order of mg. The electrolytic solution holding rate was determined by the following formula:

Electrolytic solution holding rate under pressure (%)=(W1−W)/W×100

(13) Shut-down temperature: Shut-down temperature was defined as temperature at which real part impedance became 10 times or more as high as that measured at room temperature.

(14) Melt-down temperature: Melt-down temperature was defined as temperature at which real part impedance rapidly decreased or could not be measured, and, at the same time, the non-woven fabric put between the metallic electrodes was confirmed to be molten. It is close to melting point of the resin.

EXAMPLE 1

Polybutylene terephthalate (Mitsubishi Rayon, TUFPET) was melt-blown at an extrusion temperature of 290° C. under the conditions shown in Table 1, to prepare the non-woven fabric having an average fiber diameter of 1.5 μm and basis weight of 25 g/m². It was calendered to prepare a separator having an air permeability of 6 cc/cm²/sec, thickness of 50 μm and tensile strength of 5 kgf/50 mm. The characteristics of the melt-blown, non-woven fabric and separator are given in Table 1.

EXAMPLE 2

The melt-blown, non-woven fabric and separator were prepared in the same manner as in EXAMPLE 1, except that discharge rate and air temperature as the melt-blowing conditions were changed as shown in Table 1. Their characteristics are given in Table 1.

COMPARATIVE EXAMPLE 1

The melt-blown, non-woven fabric and separator were prepared in the same manner as in EXAMPLE 1, except that the melt-blown, non-woven fabric of polybutylene terephthalate was replaced by the non-woven fabric of polybutylene terephthalate prepared by the dry method, shown in Table 1. Their characteristics are given in Table 1.

TABLE 1

|  |  |  | EXAMPLES | | Co. EXAMPLE |
|---|---|---|---|---|---|
|  |  |  | 1 | 2 | 1 |
| Stock material for non-woven fabric | | | PBT | PBT | PP |
| Method of producing the non-woven fabric | | | MB | MB | MB |
| Melt-blowing conditions | Hole diameter | mm φ | 0.38 | 0.38 | 0.38 |
| | Number of holes | no./cm | 12 | 12 | 12 |
| | Extrusion Temperature | ° C. | 290 | 290 | 360 |
| | Discharge rate | G/min/hole | 0.36 | 0.42 | 0.28 |
| | Air temperature | ° C. | 300 | 290 | 310 |
| Non-woven fabric properties | Fiber diameter | μm | 1.5 | 3 | 2 |
| | Basis weight | g/m² | 25 | 46 | 40 |
| | Air permeability | cc/cm²/sec | 6 | 37 | 7 |
| | Thickness | μm | 50 | 310 | 120 |
| | Tensile strength | kgf/50 mm | 5 | 2 | 4 |
| Separator properties | Impedance (room temperature) | Ω · cm² | 6 | 6 | 12 |
| | Max. impedance (100 to 180° C.) | Ω · cm² | 52 | 85 | 15,200 |
| | Heat-resistant strength | kgf/50 mm | 5 | 2 | 0.1 (Deterioration) |
| | Short-circuit | @400 V | Not observed | Not observed | Not observed |

EXAMPLE 3

Polybutylene terephthalate (Mitsubishi Rayon, TUFPET) was melt-blown at an extrusion temperature of 290° C. under the conditions shown in Table 2, to prepare the non-woven fabric having an average fiber diameter of 1.5 μm and basis weight of 25 g/m². It was calendered to prepare a separator having an air permeability of 6 cc/cm²/sec, thickness of 50 μm and tensile strength of 5 kgf/50 mm. Their characteristics are given in Table 2.

EXAMPLES 4 TO 6

The melt-blown, non-woven fabrics and separators were prepared in the same manner as in EXAMPLE 1, except that extrusion temperature and air flow rate as the melt-blowing conditions were changed as shown in Table 2. Their characteristics are given in Table 2.

COMPARATIVE EXAMPLE 2

The melt-blown, non-woven fabric and separator were prepared in the same manner as in EXAMPLE 3, except that the non-woven fabric of polybutylene terephthalate was replaced by the melt-blown, non-woven fabric of polypropylene shown in Table 1. Their characteristics are given in Table 2.

TABLE 2

| | | | EXAMPLES | | | | Co. EXAMPLE |
|---|---|---|---|---|---|---|---|
| | | | 3 | 4 | 5 | 6 | 2 |
| Stock material for non-woven fabric | | | PBT | PBT | PBT | PBT | PP |
| Method of producing the non-woven fabric | | | MB | MB | MB | MB | MB |
| Melt-blowing conditions | Hole diameter | mm φ | 0.38 | 0.38 | 0.38 | 0.38 | 0.38 |
| | Number of holes | No./cm | 12 | 12 | 12 | 12 | 12 |
| | Extrusion temperature | ° C. | 290 | 290 | 320 | 300 | 360 |
| | Discharge rate | g/min/hole | 0.36 | 0.42 | 0.42 | 0.36 | 0.28 |
| | Air temperature | ° C. | 300 | 290 | 300 | 300 | 310 |
| Non-woven fabric properties | Fiber diameter | μm | 1.5 | 3 | 2.0 | 2.5 | 2 |
| | Basis weight | g/m² | 25 | 46 | 14 | 20 | 40 |
| | Air permeability | cc/cm²/sec | 6 | 37 | 59 | 43 | 7 |
| | Thickness | μm | 50 | 310 | 70 | 100 | 120 |
| | Tensile strength | Kgf/50 mm | 5 | 2 | 1.3 | 1.2 | 4 |
| Separator properties | Impedance | Ω · cm² | 7.3 | 9.0 | 4.2 | 5.1 | 12.1 |
| | Heat-resistant strength | kgf/50 mm | 5 | 2 | 1.3 | 1.2 | 0.1 (Deterioration) |
| | Short-circuit | @400 V | Not observed | Not observed | Not observed | Not observed | Not observed |

EXAMPLE 7

Polymethyl pentene (Mitsui Chemicals, TPX-DX820) was melt-blown at an extrusion temperature of 290° C. under the conditions shown in Table 3, to prepare the non-woven fabric having an average fiber diameter of 4.1 μm and basis weight of 19.8 g/m². It was calendered to prepare a separator having an air permeability of 98 cc/cm²/sec, thickness of 0.49 mm and tensile strength of 10N/50 mm in the MD direction. Their characteristics are given in Table 3.

EXAMPLES 8 TO 11

The melt-blown, non-woven fabrics and separators were prepared in the same manner as in EXAMPLE 7, except that discharge rate, air temperature as the melt-blowing conditions and basis weight of the non-woven fabrics were changed as shown in Table 3. Their characteristics are given in Table 3.

COMPARATIVE EXAMPLE 3

The melt-blown, non-woven fabric and separator were prepared in the same manner as in EXAMPLE 7, except that the melt-blown, non-woven fabric of polymethyl pentene was replaced by the non-woven fabric of polypropylene shown in Table 3. Their characteristics are given in Table 3.

TABLE 3

| | | | EXAMPLES | | | | | Co. EXAMPLE |
|---|---|---|---|---|---|---|---|---|
| | | | 7 | 8 | 9 | 10 | 11 | 3 |
| Stock material for non-woven fabric | | | TPX | TPX | TPX | TPX | TPX | PP |
| Method of producing the non-woven fabric | | | MB | MB | MB | MB | MB | MB |
| Melt-blowing conditions | Hole diameter | mm φ | 0.38 | 0.38 | 0.38 | 0.38 | 0.38 | 0.38 |
| | Number of holes | No./cm | 12 | 12 | 12 | 12 | 12 | 12 |
| | Extrusion temperature | ° C. | 300 | 300 | 300 | 380 | 420 | 360 |
| | Discharge rate | g/min/hole | 0.21 | 0.21 | 0.21 | 0.25 | 0.31 | 0.28 |
| | Air temperature | ° C. | 300 | 300 | 300 | 300 | 300 | 310 |
| Non-woven fabric properties | Basis weight | g/m² | 19.8 | 15.1 | 30.0 | 51.1 | 63.5 | 22.0 |
| | Thickness | mm | 0.49 | 0.12 | 0.30 | 0.88 | 0.85 | 0.22 |
| | Air permeability | cc/cm²/sec | 98 | 61 | 38 | 41 | 22 | 65 |
| | Fiber diameter | μm | 4.1 | 3.9 | 4.2 | 5.1 | 4.3 | 40 |
| | MD strength | N/50 mm | 10 | 11 | 23 | 21 | 34 | 39 |
| Separator properties | Impedance (room temperature) | Ω · cm² | 2 | 2 | 4 | 6 | 7 | 6 |
| | Max. Impedance (100~180° C.) | Ω · cm² | 11 | 13 | 19 | 28 | 40 | 280 |
| | Heat-resistant strength | N/50 mm | 10 | 11 | 23 | 21 | 34 | 1 (Deterioration) |
| | Short-circuit | @400 V | Not observed | Not observed | Not observed | Not observed | Not observed | Not observed |

EXAMPLE 12

A melt-blown, non-woven fabric of polybuthylene terephthalate having an average fiber diameter of 2.1 μm, basis weight of 10 g/m², thickness of 130 μm and air permeability of 120 cc/cm²/sec as the first layer was laminated with a melt-blown, non-woven fabric of polypropylene having an average fiber diameter of 1.5 μm, basis weight of 5 g/m², thickness of 60 μm and air permeability of 150 cc/cm²/sec as the second layer. The resultant laminate was calendered at 140° C. to prepare the laminate of non-woven PBT/PP fabrics having a basis of 15 g/m², thickness of 50 μm and air permeability of 14.9 cc/cm²/sec. The characteristics of the laminate as the separator are given in Table 4.

EXAMPLE 13

A melt-blown, non-woven fabric of polyethylene terephthalate having an average fiber diameter of 2.1 μm, basis weight of 10 g/m², thickness of 130 μm and air permeability of 120 cc/cm²/sec as the first layer was laminated with a melt-blown, non-woven fabric of polypropylene having an average fiber diameter of 1.5 μm, basis weight of 7 g/m², thickness of 80 μm and air permeability of 100 cc/cm²/sec as the second layer. The resultant laminate was calendered at 140° C. to prepare the laminate of non-woven PBT/PP fabrics having a basis weight of 17 g/m², thickness of 60 μm and air permeability of 32.4 cc/cm²/sec. The characteristics of the laminate as the separator are given in Table 4.

EXAMPLE 14

A melt-blown, non-woven fabric of polypropylene having an average fiber diameter of 1.5 μm, basis weight of 5 g/m², thickness of 60 μm and air permeability of 150 cc/cm²/sec as the first layer, melt-blown, non-woven fabric of polybutylene terephthalate having an average fiber diameter of 2.1 μm, basis weight of 14 g/m², thickness of 145 μm and air permeability of 80 cc/cm²/sec as the second layer, and the same melt-blown, non-woven fabric of polypropylene as that for the first layer as the third layer were laminated with each other. The resultant laminate was calendered at 140° C. to prepare the laminate of non-woven PP/PBT/PP fabrics having a basis weight of 24 g/m², thickness of 80 μm and air permeability of 11.4 cc/cm²/sec. The characteristics of the laminate as the separator are given in Table 4

EXAMPLE 15

A melt-blown, non-woven fabric of polybutylene terephthalate having an average fiber diameter of 2.1 μm, basis weight of 10 g/m², thickness of 130 μm and air permeability of 120 cc/cm²/sec as the first layer was laminated with a melt-blown, non-woven fabric of polypropylene having an average fiber diameter of 3.5 μm, basis weight of 10 g/m², thickness of 130 μm and air permeability of 115 cc/cm²/sec as the second layer. The resultant laminate was embossed at 150° C. to prepare the laminate of non-woven PBT/PP fabrics having a basis weight of 20 g/m², thickness of 160 μm and air permeability of 48.0 cc/cm²/sec. The characteristics of the laminate as the separator are given in Table 4.

EXAMPLE 16

A melt-blown, non-woven fabric of polybutylene terephthalate having an average fiber diameter of 2.1 μm, basis weight of 10 g/μm², thickness of 130 μm and air permeability of 120 cc/cm²/sec as the first layer was laminated with a melt-blown, non-woven fabric of polypropylene having an average fiber diameter of 1.5 μm, basis weight of 10 g/m², thickness of 100 μm and air permeability of 65 cc/cm²/sec as the second layer. The resultant laminate was embossed at 150° C. to prepare the laminate of non-woven PBT/PP fabrics having a basis weight of 20 g/m², thickness of 160 μm and air permeability of 42.0 cc/cm²/sec. The characteristics of the laminate as the separator are given in Table 4.

EXAMPLE 17

A melt-blown, non-woven fabric of polypropylene having an average fiber diameter of 2.8 μm, basis weight of 7 g/m², thickness of 100 μm and air permeability of 190 cc/cm²/sec as the first layer, melt-blown, non-woven fabric of polybutylene terephthalate having an average fiber diameter of 2.1 μm, basis weight of 10 g/m², thickness of 130 μm and air permeability of 120 cc/cm²/sec as the second layer, and the same melt-blown, non-woven fabric of polypropylene as that for the first layer as the third layer were laminated with each other. The resultant laminate was embossed at 150° C. to prepare the laminate of non-woven PP/PBT/PP fabrics having a basis weight of 24 g/m², thickness of 170 μm and air permeability of 44.0 cc/cm²/sec. The characteristics of the laminate as the separator are given in Table 4.

EXAMPLE 18

A melt-blown, non-woven fabric of polyphenylene sulfide having an average fiber diameter of 2.5 μm, basis weight of 25 g/m², thickness of 195 μm and air permeability of 46 cc/cm²/sec as the first layer was laminated with a melt-blown, non-woven fabric of polyethylene having an average fiber diameter of 4.0 μm, basis weight of 15 g/m², thickness of 160 μm and air permeability of 105 cc/cm/sec as the second layer. The resultant laminate was ultrasonically embossed to prepare the laminate of non-woven PPS/PE fabrics having a basis weight of 40 g/m², thickness of 250 μm and air permeability of 21.0 cc/cm²/sec. The characteristics of the laminate as the separator are given in Table 4.

COMPARATIVE EXAMPLE 4

A melt-blown, non-woven fabric of polypropylene having an average fiber diameter of 3.5 μm, basis weight of 10 g/m², thickness of 130 μm and air permeability of 115 cc/cm²/sec was used for the first and second layers. The laminate of these layers was calendered at 120° C. to prepare the laminate of non-woven PP/PP fabrics having a basis weight of 20 g/m², thickness of 50 μm and air permeability of 5.7 cc/cm²/sec. The characteristics of the laminate as the separator are given in Table 4.

COMPARATIVE EXAMPLE 5

A melt-blown, non-woven fabric of polybutylene terephthalate having an average fiber diameter of 2.1 μm, basis weight of 10 g/m², thickness of 130 μm and air permeability of 120 cc/cm²/sec was used for the first and second layers. The laminate of these layers was calendered at 150° C. to prepare the laminate of non-woven PBT/PBT fabrics having a basis weight of 20 g/m², thickness of 80 μm and air permeability of 28.0 cc/cm²/sec. The characteristics of the laminate as the separator are given in Table 4.

TABLE 4

| | | | EXAMPLES | | | | | | | Co. EXAMPLES | |
|---|---|---|---|---|---|---|---|---|---|---|---|
| | | | 12 | 13 | 14 | 15 | 16 | 17 | 18 | 4 | 5 |
| First layer of non-woven fabric | Polymer | | PBT | PBT | PP | PBT | PBT | PP | PPS | PP | PBT |
| | Fiber diameter | μm | 2.1 | 2.1 | 1.5 | 2.1 | 2.1 | 2.8 | 2.5 | 3.5 | 2.1 |
| | Basis weight | g/m² | 10 | 10 | 5 | 10 | 10 | 7 | 25 | 10 | 10 |
| | Thickness | μm | 130 | 130 | 60 | 130 | 130 | 100 | 195 | 130 | 130 |
| | Air permeability | cc/cm²/sec | 120 | 120 | 150 | 120 | 120 | 190 | 46 | 115 | 120 |

TABLE 4-continued

|  |  |  | EXAMPLES | | | | | | | Co. EXAMPLES | |
|---|---|---|---|---|---|---|---|---|---|---|---|
|  |  |  | 12 | 13 | 14 | 15 | 16 | 17 | 18 | 4 | 5 |
| Second layer of non-woven fabric | Polymer |  | PP | PP | PBT | PP | PP | PBT | PE | PP | PBT |
|  | Fiber diameter | μm | 1.5 | 1.5 | 2.1 | 3.5 | 1.5 | 2.1 | 4.0 | 3.5 | 2.1 |
|  | Basis weight | g/m² | 5 | 7 | 14 | 10 | 10 | 10 | 15 | 10 | 10 |
|  | Thickness | μm | 60 | 80 | 145 | 130 | 100 | 130 | 160 | 130 | 130 |
|  | Air permeability | cc/cm²/sec | 150 | 100 | 80 | 115 | 65 | 120 | 105 | 115 | 120 |
| Third layer of non-woven fabric | Polymer |  | — | — | PP | — | — | PP | — | — | — |
|  | Fiber diameter | μm | — | — | 1.5 | — | — | 2.8 | — | — | — |
|  | Basis weight | g/m² | — | — | 5 | — | — | 7 | — | — | — |
|  | Thickness | μm | — | — | 60 | — | — | 100 | — | — | — |
|  | Air permeability | cc/cm²/sec | — | — | 150 | — | — | 190 | — | — | — |
| Method of lamination |  |  | Calend | Calend | Calend | Emboss | Emboss | Emboss | Emboss | Emboss | Emboss |
| Laminate | Basis weight | g/m² | 15 | 17 | 24 | 20 | 20 | 24 | 40 | 20 | 20 |
|  | Thickness | μm | 50 | 60 | 80 | 160 | 160 | 170 | 250 | 50 | 60 |
|  | Air permeability | cc/cm²/sec | 14.9 | 32.4 | 11.4 | 48.0 | 42.0 | 44.0 | 21.0 | 5.7 | 17.6 |
| Separator properties | Liquid absorption rate | mm/30 min | 30 | 28 | 23 | 45 | 51 | 48 | 60 | 15 | 54 |
|  | Liquid-holding rate | % | 144 | 150 | 138 | 388 | 385 | 326 | 317 | 61 | 120 |
|  | Impedance | Ω · cm² | 4.2 | 5.1 | 6.8 | 12.1 | 12.3 | 13.1 | 15.8 | 7.9 | 6.1 |
|  | Shut-down Temp. | ° C. | 160 | 160 | 160 | 160 | 160 | 160 | 120 | 160 | 220 |
|  | Melt-down temp. | ° C. | 220 | 220 | 220 | 220 | 220 | 220 | >250 | 160 | 220 |

As shown in Table 4, each of the separators prepared in EXAMPLES 12 to 18, composed of a laminate of two or more types of non-woven resin fabrics of different melting point, has greatly improved safety when heat is generated, because of its melt-down temperature at least 20° C. higher than its shut-down temperature. Moreover, it is well-balanced between electrolytic solution absorption rate and solution-holding rate, and hence is useful as separators for batteries or capacitors. On the other hand, each of the separators prepared in COMPARATIVE EXAMPLES 4 and 5, composed of a laminate of the same type of non-woven resin fabric, is insufficient in safety, because there is no difference between shut-down temperature and melt-down temperature.

EXAMPLE 19

A polyphenylene sulfide melt-blown non-woven fabric made from PPS (Tohpren, TR-03P, melt viscosity: 300 poise) having an average fiber diameter of 2.5 μm, basis weight of 45 g/m², thickness of 0.3 μm, air permeability of 21 cc/cm²/sec and strength of 44N/50 mm in the MD direction, and another type of polyphenylene-based, melt-blown, non-woven fabric having an average fiber diameter of 2.5 μm, basis weight of 25 g/m², thickness of 0.18 mm, air permeability of 40 cc/cm²/sec and strength of 24N/50 mm in the MD direction were calendered at 150° C. to prepare the laminate having a basis weight of 70 g/m², thickness of 150 μm, air permeability of 5 cc/cm²/sec and strength of 80N/50 mm in the MD direction. The characteristics of the laminate as the separator are given in Table 5.

EXAMPLE 20

A polyphenylene sulfide melt-blown non-woven fabric made from PPS (Tohpren, TR-03P, melt viscosity: 300 poise) having an average fiber diameter of 2.5 μm, basis weight of 35 g/m², thickness of 0.25 μm, air permeability of 28 cc/cm²/sec and strength of 36N/50 mm in the MD direction, and another type of polyphenylene-based, melt-blown, non-woven fabric having an average fiber diameter of 2.5 μm, basis weight of 25 g/m², thickness of 0.18 mm, air permeability of 40 cc/cm²/sec and strength of 24N/50 mm in the MD direction were calendered at 150° C. to prepare the laminate having a basis weight of 60 g/m², thickness of 0.12 mm, air permeability of 5 cc/cm²/sec and strength of 68N/50 mm in the MD direction. The characteristics of the laminate as the separator are given in Table 5.

EXAMPLE 21

A polyphenylene sulfide melt-blown non-woven fabric made from PPS (Tohpren, TR-03P, melt viscosity: 300 poise) having an average fiber diameter of 3.51 μm, basis weight of 30 g/m², thickness of 0.2 mm, air permeability of 63 cc/cm²/sec and strength of 29N/50 mm in the MD direction, and another type of polyphenylene-based, melt-blown, non-woven fabric having an average fiber diameter of 3.5 μm, basis weight of 25 g/m², thickness of 0.15 mm, air permeability of 70 cc/cm²/sec and strength of 25N/50 mm in the MD direction were calendered at 150° C. to prepare the laminate having a basis weight of 55 g/m², thickness of 0.12 mm, air permeability of 11 cc/cm²/sec and strength of 62N/50 mm in the MD direction. The characteristics of the laminate as the separator are given in Table 5.

EXAMPLE 22

A polyphenylene sulfide melt-blown non-woven fabric made from PPS (Tohpren, TR-03P, melt viscosity: 300 poise) having an average fiber diameter of 2.5 μm, basis weight of 20 g/m², thickness of 0.15 mm, air permeability of 52 cc/cm²/sec and strength of 20N/50 mm in the MD direction, and another type of polyphenylene-based, melt-blown, non-woven fabric having an average fiber diameter of 2.5 μm, basis weight of 20 g/m², thickness of 0.15 mm, air permeability of 52 cc/cm²/sec and strength of 20N/50 mm in the MD direction were calendered at 150° C. to prepare the laminate having a basis weight of 40 g/m², thickness of 0.10 mm, air permeability of 12 cc/cm²/sec and strength of 45N/50 mm in the MD direction. The characteristics of the laminate as the separator are given in Table 5.

COMPARATIVE EXAMPLE 6

A polyphenylene sulfide melt-blown non-woven fabric made from PPS (Tohpren, TR-03P, melt viscosity: 300 poise) having an average fiber diameter of 2.5 μm, basis weight of 70 g/m², thickness of 0.15 mm, air permeability of 5 cc/cm²/sec and strength of 71N/50 mm in the MD direction was used for a separator. The characteristics of the laminate as the separator are given in Table 5.

COMPARATIVE EXAMPLE 7

A polyphenylene sulfide melt-blown non-woven fabric made from PPS (Tohpren, TR-03P, melt viscosity: 300 poise) having an average fiber diameter of 2.5 μm, basis weight of 15 g/m², thickness of 0.12 mm, air permeability of 73 cc/cm²/sec and strength of 16N/50 mm in the MD direction, and another type of polyphenylene-based, melt-blown, non-woven fabric having an average fiber diameter of 2.5 μm, basis weight of 70 g/m², thickness of 0.68 mm, air permeability of 17 cc/cm²/sec and strength of 62N/50 mm in the MD direction were calendered at 150° C. to prepare the laminate having a basis weight of 85 g/m², thickness of 0.15 mm, air permeability of 1.5 cc/cm²/sec and strength of 85N/50 mm in the MD direction. The characteristics of the laminate as the separator are given in Table 5.

double-layer capacitors serviceable at high temperature, e.g., vehicle-carried or reflow-solderable batteries. Moreover, it is excellent in resistance to short-circuit, highly compatible with the electrolytic solution, and capable of controlling internal electrical resistance at a low level. At the same time, low electrical resistance of the separator makes it suitable for lithium batteries and electrical double-layer capacitors which use an organic solvent of low electroconductivity.

The laminated heat-resistant separator of the present invention has a function of blocking permeability at low temperature (shut-down function), sustains the separator shape even at high temperature to prevent explosive temperature run-away, e.g., melt-down, and is safer tan a battery separator of single composition. It is particularly useful for batteries and capacitors of high energy density, for which safety is a most important consideration.

What is claimed is:

1. A laminated heat-resistant separator, comprising:
 a laminated non-woven fabric, comprising:
  at least two laminated non-woven fabric layers, including at least one non-woven fabric layer comprising a high-melting resin and having:

TABLE 5

|  |  |  | EXAMPLES | | | | Co. EXAMPLES | |
| --- | --- | --- | --- | --- | --- | --- | --- | --- |
|  |  |  | 19 | 20 | 21 | 22 | 6 | 7 |
| First layer of non-woven fabric of PPS | Fiber diameter | μm | 2.5 | 2.5 | 3.5 | 2.5 | 2.5 | 2.5 |
|  | Basis weight | g/m² | 45 | 35 | 30 | 20 | 70 | 15 |
|  | Thickness | mm | 0.30 | 0.25 | 0.20 | 0.15 | 0.15 | 0.12 |
|  | Air permeability | cc/cm²/sec | 21 | 28 | 63 | 52 | 5 | 73 |
|  | Strength(MD) | N/50 mm | 44 | 36 | 29 | 20 | 71 | 16 |
| 2nd layer of non-woven fabric of PPS | Fiber diameter | μm | 2.5 | 2.5 | 3.5 | 2.5 | — | 2.5 |
|  | Basis weight | g/m² | 25 | 25 | 25 | 20 | — | 70 |
|  | Thickness | mm | 0.18 | 0.18 | 0.15 | 0.15 | — | 0.68 |
|  | Air permeability | cc/cm²/sec | 40 | 40 | 70 | 52 | — | 17 |
|  | Strength(MD) | N/50 mm | 24 | 24 | 25 | 20 | — | 62 |
| Method of lamination |  |  | Calend. | Calend. | Calend. | Calend. | — | Calend. |
| Laminate | Fiber diameter | μm | 2.5 | 2.5 | 3.5 | 2.5 | — | 2.5 |
|  | Basis weight | g/m² | 70 | 60 | 55 | 40 | — | 85 |
|  | Thickness | mm | 0.15 | 0.12 | 0.12 | 0.10 | — | 0.15 |
|  | Air permeability | cc/cm²/sec | 5 | 5 | 11 | 12 | — | 1.5 |
|  | Strength(MD) | N/50 mm | 80 | 68 | 62 | 45 | — | 85 |
| Separator properties | Liquid absorption rate | mm/30 min | 20 | 23 | 28 | 22 | 21 | 25 |
|  | Liquid-holding rate under pressure | % | 7.2 | 6.9 | 5.1 | 6.5 | 3.5 | 3.9 |
|  | Impedance | Ω·cm² | 1.8 | 1.9 | 1.8 | 1.6 | 1.8 | 2.3 |

As shown in Table 5, each of the separators of the present invention prepared in EXAMPLES 19 to 22, composed of a laminate of two or more types of non-woven resin fabrics of PPS, is excellent in liquid absorption rate, liquid-holding rate under pressure and impedance. The separator of single layer of non-woven resin fabric of PPS, prepared in COMPARATIVE EXAMPLE 6, has a lower liquid-holding rate under pressure, in spite of similarity in average fiber diameter, basis weight, thickness and air permeability to that for the above laminate. The separator prepared in COMPARATIVE EXAMPLE 7 has a lower liquid-holding rate under pressure and higher impedance to increase internal electrical resistance of the battery, although composed of a laminate of two melt-blown, non-woven fabrics of PPS, because of their basis weight levels out of the desired range.

INDUSTRIAL APPLICABILITY

The heat-resistant separator of the present invention is more resistant to heat, and hence safer, than a separator of polypropylene, and is suitable for batteries and electrical an average fiber diameter of 1 to 20 μm,
 a basis weight of 5 to 300 g/m²,
 air permeability of 1 to 300 cc/cm²/sec, and
 a thickness of 0.01 to 1.0 mm,
 wherein said at least two laminated non-woven fabric layers are laminated such that at an interface between layers, only a top and/or bottom surface of a layer is in communication with only a top and/or bottom surface of a subsequent layer.

2. The laminated heat-resistant separator according to claim 1, having a real part impedance of 20 Ω·cm² or less at a frequency of 10 KHz and normal temperature.

3. The laminated heat-resistant separator according to any one of claim 1 or 2, having a maximum real part impedance at a frequency of 10 KHz and 100 to 180° C. is 100 times or less of the real part impedance at normal temperature and 200 Ω·cm² or less in the absolute value.

4. The laminated heat-resistant separator according to claim 3, wherein said high melting resin is selected from the group consisting of polyester, polyphenylene sulfide, polymethyl pentene and polyamide.

5. The laminated heat-resistant separator according to claim 4, wherein said polyester is polybutylene terephthalate.

6. The laminated heat-resistant separator according to claim 1, wherein said non-woven fabric is melt-blown.

7. The laminated heat-resistant separator according to claim 1, wherein at least two non-woven fabric layers comprise a high-melting resin.

8. The laminated heat-resistant separator according to claim 7, said separator comprising: a polyamide layer and a polybutylene terephthalate layer; a polyphenylene sulfide layer and a polybutylene terephthalate layer; or a polyamide layer and a polyphenylene sulfide layer.

9. The laminated heat-resistant separator according to claim 1, further comprising at least one non-woven fabric layer having a shut-down function.

10. The laminated heat-resistant separator according to claim 9, said at least one non-woven fabric layer having a shut-down function comprises a low melting resin.

11. The laminated heat-resistant separator according to claim 10, said low-melting resin comprises polyolefin.

12. The laminated heat-resistant separator according to claim 10, said separator comprising: a polyamide layer and a polypropylene layer; a polyamide layer and a polyethylene layer; a polybutylene terephthalate layer and a polypropylene layer; a polybutylene terephthalate layer and a polyethylene layer; a polyphenylene sulfide layer and a polypropylene layer; a polyphenylene sulfide layer and a polyethylene layer; a polypropylene layer, a polybutylene terephthalate layer and a polyethylene layer; or a polypropylene layer, a polyphenylene sulfide layer and a polyethylene layer.

13. A laminated heat-resistant separator comprising:

two or more laminated layers of melt-blown, non-woven fabric of polyphenylene sulfide, said fabric having
a fiber diameter of 2.0 to 8.0 $\mu$m,
a basis weight of 20 to 60 g/m$^2$,
air permeability of 10 to 200 cc/cm$^2$/sec,
a thickness of 100 to 300 $\mu$m, and
strength of 10 N/50 mm or more in the MD direction,
wherein said at least two laminated non-woven fabric layers are laminated such that at an interface between layers, only a top and/or bottom surface of a layer is in communication with only a top and/or bottom surface of a subsequent layer.

14. The laminated heat-resistant separator of polyphenylene sulfide according to claim 13, wherein said melt-blown, non-woven fabric of polyphenylene sulfide for the laminated layers has an average fiber diameter of 2.0 to 8.0 $\mu$m, basis weight of 40 to 80 g/m$^2$, air permeability of 5 to 20 cc/cm$^2$/sec, thickness of 100 to 180 $\mu$m, and strength of 40 N/50 mm or more in the MD direction.

15. The heat-resistant separator of any one of claim 1 or 13 which is used for battery or capacitor.

16. The laminated heat-resistant separator according to any one of claim 1 or 13, wherein layers are laminated using heat and compression.

17. The laminated heat-resistant separator according to any one of claim 1 or 13, wherein said layers are laminated using ultrasonication and compression.

* * * * *